Oct. 24, 1950 F. M. JONES 2,526,874
APPARATUS FOR HEATING OR COOLING THE
ATMOSPHERE WITHIN AN ENCLOSURE
Filed Sept. 22, 1947 4 Sheets-Sheet 1

Inventor
FREDERICK M. JONES
By *P. M. Whiteley*
Attorney

Oct. 24, 1950                 F. M. JONES               2,526,874
APPARATUS FOR HEATING OR COOLING THE
ATMOSPHERE WITHIN AN ENCLOSURE

Filed Sept. 22, 1947                                   4 Sheets-Sheet 4

Inventor
FREDERICK M. JONES.
BY
P. U. Whiteley
Attorney

Patented Oct. 24, 1950

2,526,874

UNITED STATES PATENT OFFICE 2,526,874

APPARATUS FOR HEATING OR COOLING THE ATMOSPHERE WITHIN AN ENCLOSURE

Frederick M. Jones, Minneapolis, Minn., assignor to The U. S. Thermo Control Company, Minneapolis, Minn., a corporation of Minnesota Application September 22, 1947, Serial No. 775,468

15 Claims. (Cl. 62—6)

My invention relates to improvements in a refrigeration apparatus which is adapted for use in either heating or cooling the atmosphere within an enclosure such as a vehicle used for transporting perishable materials. In transporting perishable materials, such as fresh foodstuffs, it is essential to carefully control the temperature within the space in which the perishable materials are stored so as to protect the materials from deterioration resulting from either bacterial acion, spoilage or freezing. During the season when outdoor temperatures are relatively high, it is necessary to refrigerate the interior of the enclosure or vehicle to inhibit bacterial action or spoilage, and during the period when outdoor temperatures are low, it is necessary to heat the atmosphere within the enclosure to prevent the perishable materials from freezing.

In my copending application, Ser. No. 720,464 filed January 6, 1947, which is for the reissue of Patent No. 2,336,735, granted December 14, 1943, now Reissue Patent 23,000 dated May 11, 1948, I have disclosed a refrigeration apparatus which is adapted for mounting in a wall of a transport vehicle such as a cargo truck or a railway car, for either heating or cooling the atmosphere within the interior of the vehicle, depending on the temperature of the air surrounding the vehicle. In the previous disclosure is shown an apparatus which is adapted to be mounted in a wall of the vehicle with a portion of the apparatus extending into the interior thereof, and another portion of the apparatus extending outwardly from the wall structure. The portion which extends into the interior of the enclosure contains a heat exchanger that conveys a refrigerant fluid which absorbs heat from the atmosphere within the enclosure when the system is adjusted for cooling, or which radiates heat from the gases when the system is adjusted for heating, it being understood that the system is easily converted from one condition to another depending upon which condition is required to suitably protect the transported materials. The portion which extends on the outside of the enclosure contains the operative mechanism for furnishing the exchange of heat. In either arrangement the same fluid is utilized in the heat exchanger but it is circulated in a different manner to provide the two different conditions. The operative mechanism includes a compressor, a motive power device for driving the compressor, a condenser and a receiver, and other unusual parts of a refrigeration system including the control elements for controlling the operation thereof.

The operative mechanism is enclosed in a casing which provides ventilation on several sides, so as to dissipate the heat generated by the motive power device, the compressor and the condenser. When the apparatus is used for cooling the atmosphere within the enclosed space of the transport vehicle, the casing structure surrounding the operative mechanism previously disclosed, is entirely satisfactory for it is essential to efficient operation of the refrigeration unit to provide a maximum amount of ventilation over the operative mechanism and particularly the condenser, so as to fully condense the compressed refrigerant gases before they reach the refrigerant liquid receiver. However, when the apparatus is used to supply heat to the interior of the enclosure or vehicle, the outside temperature is likely to be so low as to dissipate the major portion of available heat carried by the fluid before it can be successfully delivered by the fluid to the interior of the enclosure. This will be more fully appreciated when it is understood that the heat which is conveyed through the gases to the interior of the enclosure is generated by compression of the gases, together with a certain amount of heat which is radiantly or otherwise transmitted to the compressed gases by the motive power device which drives the compressor and by the compressor itself. The amount of heat thus generated is considerable, but since the several portions of the operative mechanism, as shown in my prior patent, are contained in a well ventilated casing, and this casing is mounted on a forward surface of a moving vehicle, the heat can be quickly dissipated since cool air is drawn into the casing and forcibly circulated over the several sources of heat.

In the present invention I have provided an improved casing that surrounds the operative mechanism of the apparatus. The casing includes air flow control means in one or more of its walls for regulating the passage of air with respect to the heat generating portions of the mechanism within the interior of the casing, together with means within the casing for directing the flow of air in a cyclic manner within the casing, and a control device normally positioned within the casing for controlling the operation of the air flow control means so as to maintain the air in the casing within a predetermined range of temperature. The purpose of the invention is to provide an adequate supply of heat within the casing when the same is needed for heating purposes, without endangering damage to the operative mechanism.

An object of my invention is to provide a casing for surrounding the operative mechanism of an air conditioning apparatus in which the casing is provided with ventilating means for controlling the flow of air about the operative mechanism of the apparatus, together with a control device for controlling the ventilating means.

Another object is to provide a casing for surrounding the operative mechanism of an air conditioning apparatus in which the casing is provided with ventilating means for controlling the flow of air about the operative means of the apparatus together with thermostatic means for controlling the ventilating means in such a manner as to maintain the temperature in the casing within predetermined limits.

Another object is to provide a casing for surrounding the operative mechanism of an air conditioning apparatus in which the casing is provided with a plurality of ventilating means for controlling the flow of air through the casing, together with thermostatic means for controlling the ventilated means in such a manner that the ventilating means are sequentially opened or closed according to the temperature conditions existing within the casing, and manually operable means to replace the thermostatic control means when manual control is desirable or if the thermostatic control becomes inoperative for any reason.

Another object is to provide in a casing which encloses a condenser and a source of radiant heat, a baffle structure positioned over the source of heat and arranged to deflect the heated air within the casing in the direction of the condenser so that in effect the condenser is heated by a current of heated air or by radiant energy.

Another object is to provide a casing having ventilating means in the walls thereof in the form of a shutter assembly made up of a plurality of vanes connected to a movable member in such a manner that the vanes are simultaneously moved, together with a lost motion connection between each of the vanes and the movable member, which connection is operative to permit all of the remaining vanes to be moved to a closed position when by reason of constructional irregularities, one or more of the vanes have already reached their fully closed positions.

A further object is to provide a control device for operating the air flow control means within a ventilated casing in which the control device is composed of an expansible member and a pair of levers mounted in relation to the expansible member and to each other so as to provide sequential movement of the levers on movement of the expansible member, together with a manually operable means for replacing the expansible member when conditions are such that manual control is desirable.

Other and further objects will become apparent from the following description and claims and in the appended drawings in which:

Fig. 2 is a cross section taken on the lines 2—2 of Fig. 1, looking in the direction of the arrows;

Fig. 3 is a plan view of a portion of the structure shown in Fig. 2 with parts broken away;

Figure 1:
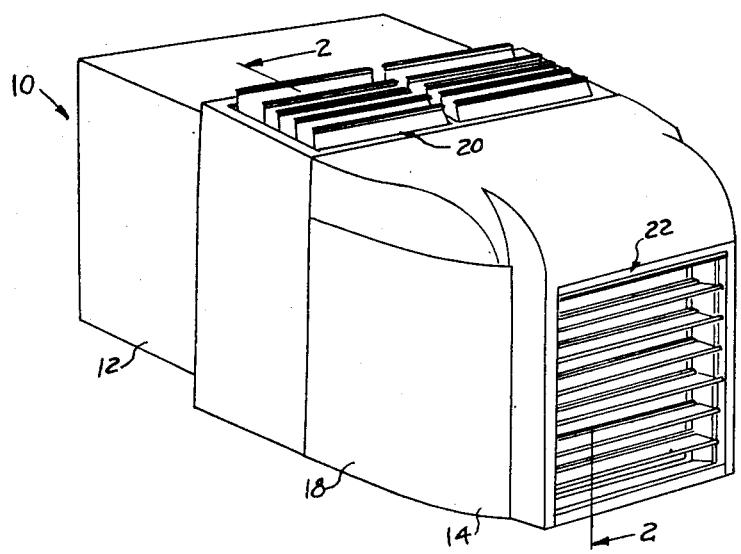
Fig. 1 is a perspective view of an air conditioning apparatus to which the present invention is applied.
Figure 5:
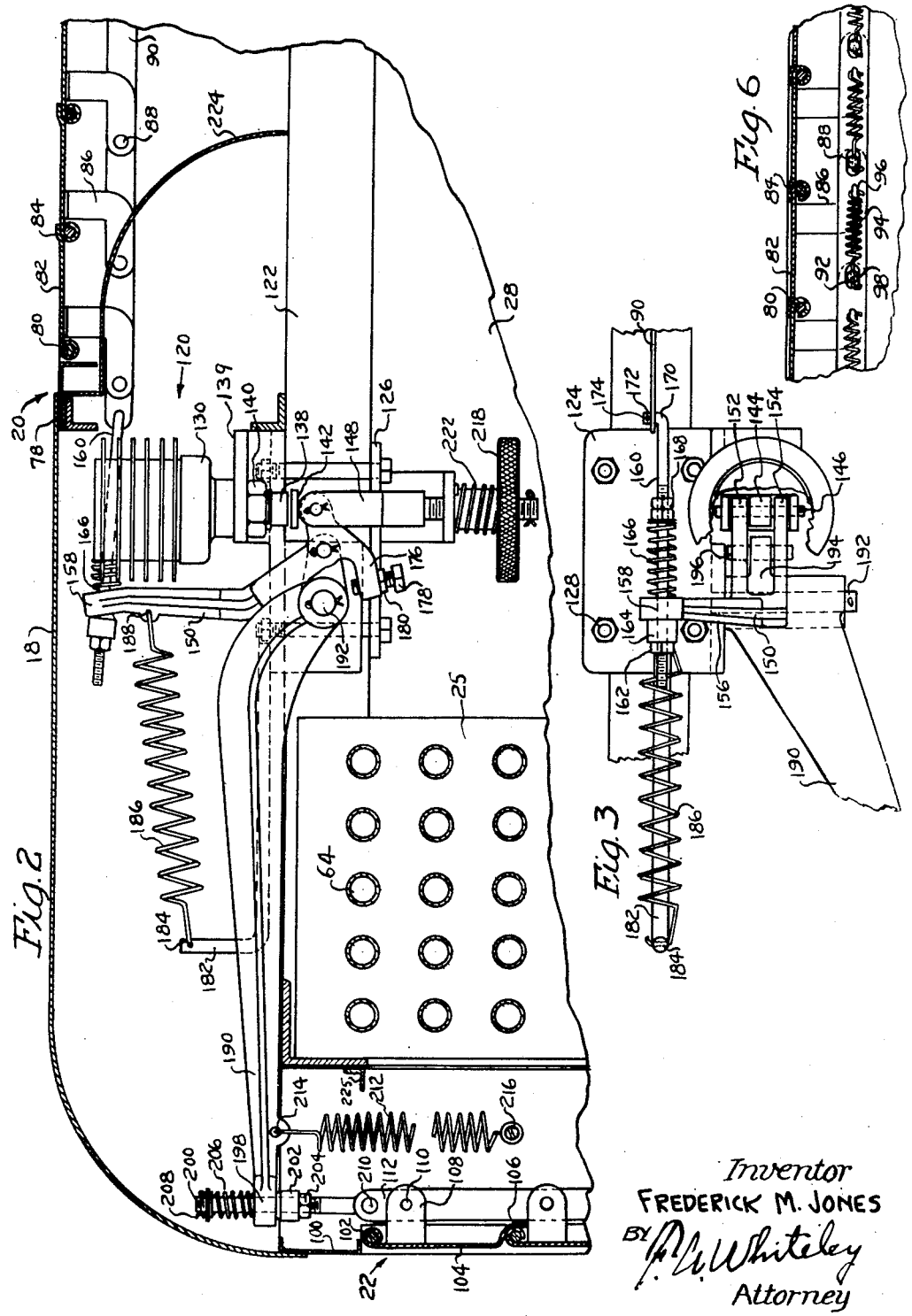
Fig. 5 is a partially schematic view of the interior of the structure shown in Fig. 1.
Figure 7:
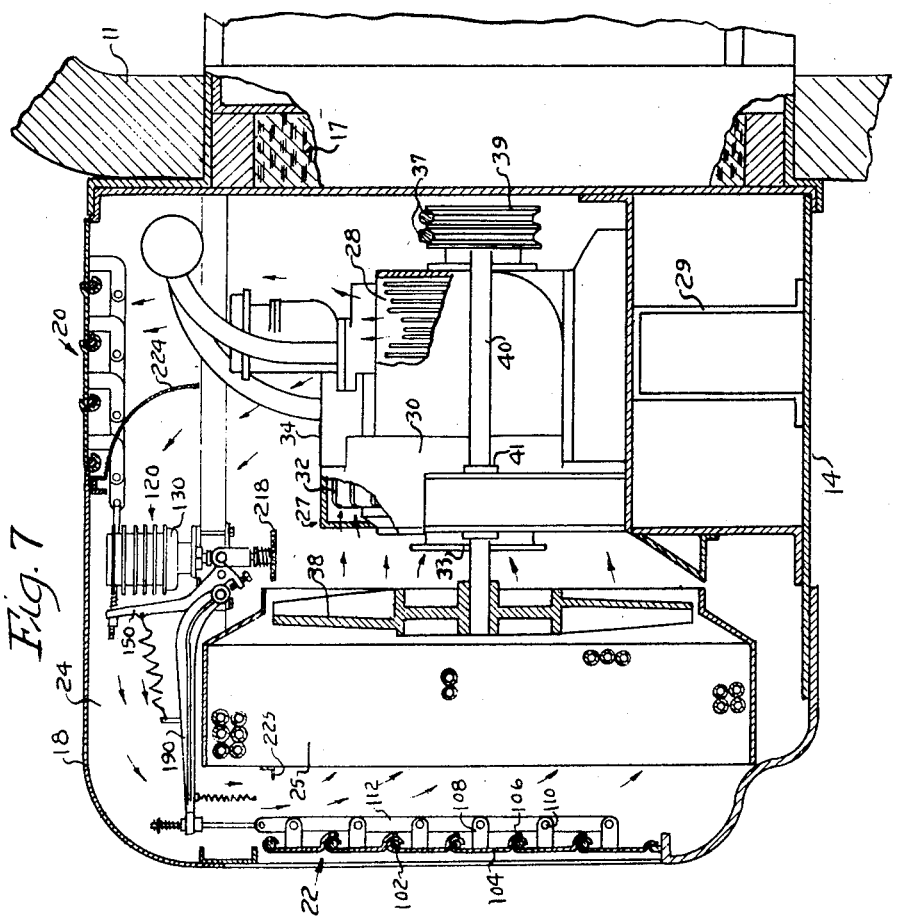
Fig. 7 is a cross section taken on the lines 7—7 of Fig. 5 looking in the direction of the arrows.

Referring now to Figs. 1, 5 and 7, is shown an air conditioning device indicated by general reference numeral 10 which is adapted for mounting in a wall of an enclosure 11 (Fig. 7), which may be of either a stationary nature such as a storage room, or of a movable nature such as a transport vehicle. In either instance the structure 10 is used for changing the condition of the atmosphere within the interior of the enclosure 11.

As shown in Fig. 5, the structure 10 consists of a first portion 12 which is adapted to extend through a wall of enclosure 11 for conditioning the atmosphere therein, and a second portion 14 which is adapted to extend on the exterior surface of the enclosure. A partition 16 which is filled with an insulating material 17 (Fig. 7) is provided to insulate portion 12 from portion 14. Portion 14, Figs. 1 and 7, is enveloped within a metallic casing 18 which on its upper surface contains an air flow control means or shutter assembly indicated by the general reference numeral 20 and on its forward lateral surface another air flow control means or shutter assembly indicated by the general reference numeral 22. Except for the air flow control means 20 and 22, casing 18 is a relatively closed casing in that it completely encloses an area 24 which is defined by the several surfaces of casing 18 and the portion 16. The casing 18 is made of several pieces of metal suitably joined one to another and provided with suitable doors for gaining access to the space 24. However, the casing is not air-tight even when the several openings are closed, as it is necessary to permit the entry of sufficient air to supply the combustion needs of the engine.

Mounted within the space 24, as shown in Figs. 5 and 7, is a refrigerant condenser 25, a compressor 26, and a motive power device indicated by the general reference numeral 27, which may be either an electric motor or any other form of motor, but which is shown as an internal combustion engine 28 mounted on a supporting bracket 29. Surrounding engine 28 is a shroud 30, and rotatively mounted within the shroud is a fan 32. The fan 32 draws air into the shroud through an opening 33 and after the air passes over the engine it leaves by an upper opening 34. Engine 28 has a pulley 35 that is connected to a pulley 36 of compressor 26 by a pair of flexible belts 37. A second fan 38 is driven by a pulley 39 that is in contact with the belts 37 between pulleys 35 and 36. A shaft 40, which connects pulley 39 and fan 38, is supported in a bearing 41 which in turn is supported on bracket 29.

Also located within the internal space 24 of casing 18 is a refrigerant liquid receiver 42 which is in fluid communication with condenser 25 by means of a conduit 43 and a connector 44. Extending from receiver 42 is a connector fitting 45 which joins a narrow conduit 46 which has interposed into it at spaced apart distances a dehydrator 47 and a sight glass 48. Conduit 46 penetrates partition 16 and terminates in an expansion valve 49 which is joined to an evaporator 50 within portion 12, that is in heat exchange relationship with the interior area of the truck body or enclosure 11 whose condition is to be controlled.

The evaporator 50, as shown in Fig. 5, is formed of a multiplicity of coils that terminate in a return conduit 51 which is joined to a low pressure header 52 of compressor 26. A temperature responsive bulb 53 is firmly secured in heat exchange relationship with conduit 51 and is joined to expansion valve 49 by a conduit 54.

Extending from the high pressure side of compressor 26 is a header 56 which is joined by a short length of conduit 58 to a T connection 60. Another short length of conduit 62 extends between the connection 60 and a conduit 64 within condenser 25. The foregoing describes the fluid circuit when the fluid is used for cooling the evaporator 50.

Joined to T connection 60 by a short length of conduit 68 is a valve 70 which is shown as a solenoid valve, electrically controlled by means not shown. A conduit 72 extends from valve 70 to a header 74 which is joined to the center coil of the evaporator 50 by a short length of conduit 76. This latter fluid circuit described the means by which heated fluid is conducted from the compressor and the condenser to evaporator 50 when the evaporator is utilized as a heating heat exchanger.

Figure 6:
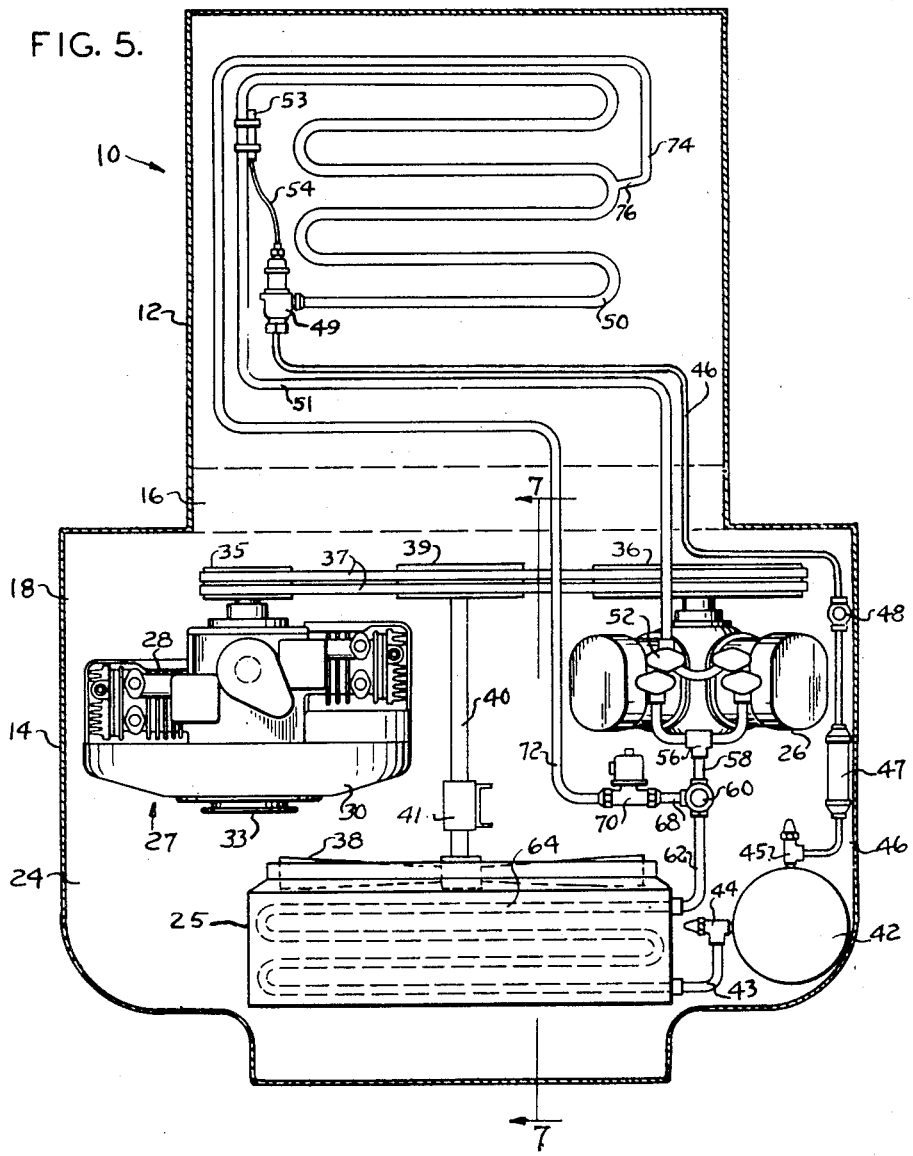
Fig. 6 is a detailed view of a portion of the shutter structure shown in Fig. 2 as seen from the opposite side of the structure.

Referring now to Fig. 2, the upper air flow control means 20 is in reality a shutter assembly composed of a frame 78 supported in casing 18 and having a plurality of rods 80 extending between lateral sides of the frame. Supported on each rod 80 is a vane 82 having a curved extremity 84 which overlaps the next vane 82 at a point where the same is supported on the next succeeding rod 80. Extending downwardly from each vane 82 is a bracket 86 carrying a fastening means such as a rivet 88. An elongated rod 90 extends on one side of each of the several brackets 86 and is provided with elongated slots 92 which are longer in their linear dimensions than the diameter of rivets 88 so as to provide a certain amount of lost motion with respect to each rivet 88. A plurality of springs 94, shown in Fig. 6, are joined at one end to ears 96 on member 90 and at the other end, springs 94 are joined to rivets 88 by extending through an aperture 98 in each of the rivets.

The air flow control means 22 is of substantially similar construction as air flow control means 20 in that it also consists of a frame member 100 supported on the forward face of casing 18 and carries a plurality of laterally extending rods 102. A plurality of vanes 104 are carried on the several rods 102 and are each provided with an inwardly turned extremity 106 that contacts the under surface of the next succeeding vane. Each of the vanes 104 carries on its under surface a bracket 108 which is joined by a fastening means such as a rivet 110 to a rod 112. The several vanes 104 of air flow control means 22 are also provided with springs, not shown, similar in construction to springs 94, shown in Fig. 6, which are joined between rod 112 and the rivets 110 in the same manner as previously disclosed.

Figure 4:
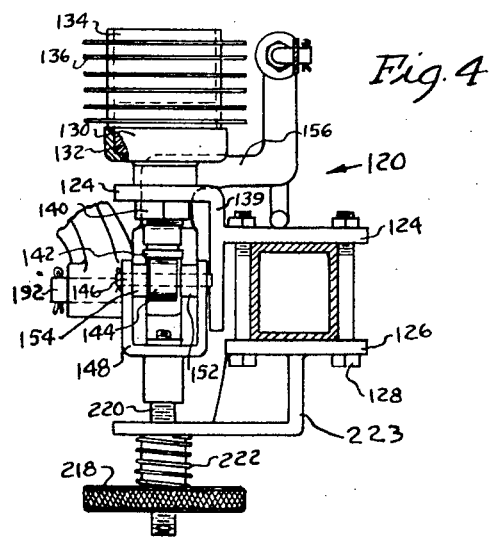
Fig. 4 is a side elevation of the structure shown in Fig. 3 as seen from the right side thereof.

In order to provide movement for each of the shutter assemblies constituting the air flow control means 20 and 22 is a control device shown in Figs. 2, 3 and 4 and indicated by the general reference numeral 120. The control device 120 is supported within the interior of casing 18 on a beam 122 by a pair of plates 124 and 126 which are joined at their several corners by conventional bolts 128. The control device 120 is formed with a closed chamber 130 which contains a thermally expansible material such as a form of wax indicated at 132. Mounted on the top of chamber 130 is a tube 134 which is open at its upper end and is provided with a plurality of peripheral fins 136 for providing a good heat conducting surface so that the temperature within the space 24 can be quickly transmitted to the material 132 within chamber 130. Extending downwardly from chamber 130 is a cylinder 138 having a portion extending into chamber 130 so as to be moved by the expansion of material 132. Cylinder 138 is held in rigid relationship with an angular portion 139 of plate 124 by a nut 140. Within its interior cylinder 138 carries a movable piston member 142 which is adapted to contact a rotatable bearing 144 that is supported by a pin 146 between the opposing arms of a bifurcated bellcrank lever member 150. The bifurcated arms 152 and 154 which, as shown in Fig. 3, surround the bearing member 144 and are all three pivotally supported on the pin 146. Toward its upper extremity, lever member 150 has an angular extension 156, as shown in Fig. 3, which terminates in a hollow enlargement 158. A rod 160 is secured in enlargement 158 of lever 150 at one end by a nut 162 and a bushing 164. Rod 160 carries a spring 166 which is secured against enlargement 158 by a pair of adjustable nuts 168. At its other end rod 160 is curved at 170 to pass through an aperture 172 in rod 90 and to be secured in such position by a cotter pin 174 passing through an aperture in the end of rod 160. On the lower end beneath pin 146, lever 150 is provided with a curved portion 176 and carries an adjustable bolt 178 which is threaded through portion 176 and which may be locked in any selected position by a nut 180. A rod 182 extends from plate 124 in the same plane as rod 160 and through a suitable aperture in a bent portion thereof engages one end 184 of a spring 186 which at its other end is joined at 188 to an upper extremity of lever 150 just beneath the enlargement 158.

A second bellcrank lever 190 is pivotally mounted on a pin 192 that extends from an angular portion of plate 124. An extension 194 of lever 190 is mounted on a movable pin 196 that also extends through the bifurcated portions 152 and 154 of bellcrank lever 150 so that as shown in Fig. 3, the extension 194 of bellcrank lever 190 is between the bifurcated portions of lever 150. As will be explained hereinafter, bellcrank lever 190 is in a degree movable by lever 150 when the lever 150 has moved to the extent that bolt 178 carried by portion 176 of lever 150 contacts the under surface of bellcrank lever 190.

On its outer end lever 190 carries an enlargement 198 through which a rod 200 similar to rod 160 extends and is secured in portion 198 by a bushing 202 and a nut 204. On its upper end rod 200 carries a spring 206 which is held in place between enlargement 198 and a suitable fastening means 208 on the end of rod 200. On its lower end rod 200 is bent and passes through an aperture 210 in member 112 to provide for movement of the several vanes 104 of the air flow control means 22. A heavy spring 212 extends between an aperture 214 in lever 190 and a fastening means 216 secured in casing 18.

Referring now to Figs. 2 and 3, a manual control means is shown for replacing the thermostatic control means when it is desired to manually control the movement of air flow control means 20 and 22. A large hand wheel 218 is rigidly mounted on a rod 220 that is threaded for movement into the lower extremity of the bifurcated member 148. A spring 222 is positioned between the upper surface of wheel 218 and a bracketed continuation 223 of the lower clamping plate 126.

A large curved baffle plate 224 is mounted on beam 122 in the upper portion of casing 18 and extends laterally across the upper portion of the space 24 immediately beneath a forward portion of the air flow control means 20. The lateral extremities of the baffle 224 are spaced inwardly from the brackets 86 of vanes 82 and rod 90 so as not to interfere with the operation of these members. Baffle 224 is situated above the motive power device 27 and compressor 26 and immediately beneath the upper air flow control means 20 so as to deflect the heated air rising from the motive power device and the compressor and directing the heated air in a cyclic manner to the front of the condenser 25.

Referring now to the several figures of the drawings, the operation of the invention will be explained in detail. With the parts in the positions shown in Figs. 2, 5 and 7, the refrigeration apparatus is mounted in a forward upper wall of an enclosure such as a cargo truck with the heat exchanging portion 12 extending into the interior of the truck and the portion 14 containing the several elements of the operating mechanism positioned on the forward surface of the truck. Assuming the outdoor temperature to be cold, the air flow control means 20 and 22 are closed and casing 18 may be regarded as substantially enclosing the operative mechanism. With the motive power device 27 in operation, the same will be driving the compressor 26, and all of the other moving parts including the fan 32 and fan 38. Inasmuch as the outdoor temperature is cold, it is desirable to heat the interior of the truck body so as to prevent freezing of perishable materials carried therein and therefore, by circuit means not shown, the solenoid valve 70 will have been moved to an open position thereby permitting hot gases from the compressor and the condenser to pass from conduits 58 and 62 through valve 70 to conduit 72 and to header 74 and through the short length of conduit 76 into the evaporator 50. The temperature responsive bulb 53 being in contact with return conduit 51 will transmit the high temperature to the expansion valve 49 and would normally cause that valve to move or remain in an open position. However, expansion valve 49 is provided with a pressure responsive diaphragm in its interior and arranged to close the valve mechanism when the internal pressure exceeds a predetermined value. Thus when the hot gases enter evaporator 50, they will quickly build up a pressure sufficient to cause valve 49 to move to a closed position and remain closed as long as the heating operation continues. The heated gases will give up a substantial amount of heat during the circuitous travel through the evaporator, and return from evaporator 50 through conduit 51 to header 52 of the compressor 26 whence the gases pass through connector 60 to conduits 62, 68.

Although the compressed gases leaving the compressor 26 may intermingle with gases present in the condenser, since the condenser is in open communication with the hot gas circuit to the evaporator which is acting as a heating heat exchanger, the exchange of heat between the condenser and the evaporator is through the molecular activity of the gases tending to maintain a uniform temperature and pressure throughout the closed system. As will be well understood by persons acquainted with the laws pertaining to gases, the temperature of a body of gas will always tend to remain uniform throughout the entire body of gas. Therefore, since the temperature of the gas in the condenser will tend to remain the same as the gas in the evaporator and any increase of the temperature of the gas in the condenser will be quickly transmitted to the gas in the evaporator.

Since the air flow control means 20 and 22 are closed and the fans 32 and 38 are in operation, air present in space 24 will be drawn through condenser 25 by fan 38 and passed over the compressor 26 and also through shroud 30 by fan 32. The air passing over the compressor and through the shroud 30 is heated by the two sources of heat and passes upwardly through space 24 and in the direction of the baffle 224 from whence it is directed to the forward part of the casing and passes downwardly between the interior of the shutter assembly 22 and condenser 25 where it is again drawn through the condenser 25 by fan 38. Thus during this phase of operation condenser 25 becomes a heat absorber and will receive heat both by radiation from the source of heat and also by the large volume of heated air which is continuously being drawn over the source of heat and circulated through the condenser by fan 38.

As the engine is in continuous operation it will generate considerable heat, and unless steps are taken to regulate this condition, the engine is very likely to over-heat, causing damage to itself, the compressor, and also the refrigeration system, since the heat thus generated will of course increase the pressure of gases present in the condenser, and those being circulated by the compressor. In order to maintain the temperature within space 24 within reasonable limits, the two air flow control means 20 and 22 are connected with a temperature responsive means for controlling their operation. As the temperature rises in space 24, the solid material 132 in the closed chamber 130 will be quickly brought to the same temperature as the space by virtue of the heat transmiting effect of the fins 136 and tube 134. As material 132 expands, the piston 142 which has a portion in contact with material 132 within chamber 130 is moved downwardly until the piston engages roller 144 moving the same together with the bifurcated member 148 and the arms 152 and 154 of bellcrank lever 150. When this occurs the bellcrank lever 150 moves in a clockwise direction on the moving pivot pin 196 and this movement is transmitted through rod 160 to rod 90 so that rod 90 moves to the right as shown in Fig. 2. On movement of rod 90 as described above, the several vanes 82 constituting air flow control means 20 are moved since the brackets 86 which extend from each of the vanes are pivotally mounted on the rod 90 by rivets 88. This will cause the several vanes 82 to swing outwardly or in a counter clockwise direction on rods 80 to the relatively full open position as shown in Fig. 1. Opening of the air flow control means 20 will permit the escape of a relatively large portion of heated air from within the space 24, but if this heat loss is not great enough, the material 132 in chamber 130 will continue to expand under the influence of the high temperature within space 24 whereupon lever 150 will continue to move in a clockwise direction until the bolt 178 engages the under side of the second bellcrank lever 190. Continued movement of lever 150 causes lever 190 to be rotated on its fixed pivot 192 and on the moving pivot 196 so that lever 190 is caused to move in unison with lever 150. The movement of lever 190 is communicated through rod 200 to rod 112 and the several vanes 104 of air flow control means 22 are moved to an open position in a counter clockwise direction inwardly on their rods 102 to permit air to enter the forward surface of casing 18 through the air flow control means 22. As movement of the levers continues, both of the air flow control means will be moved to their fully opened position and permit rapid circulation of air entering air flow control means 22 to pass through the condenser 25 and leave through air flow control means 20.

With the air flow control means 20 and 22 closed the air within space 24 travels in a cycle as shown by the arrows in Fig. 7, arising from the source of heat and passing as a column in front of the condenser where it is drawn in through the condenser and returned in part at least to the source of heat where the cycle is repeated. When the upper air flow control means 20 is opened, the cycle is partially changed to the extent that a portion of the heated air is exhausted to the outside of the casing. When, however, air flow control means 22 is opened, the uppermost of the vanes 104 in its fully opened position engages the forward surface of condenser 25 or an abutment 225 in the form of an angle iron across the face of condenser 25. This entirely closes off the flow of hot air being deflected by baffle 224 and terminates the cyclic travel of air previously described. The air travel through the casing 18 then takes the form of outside air entering air flow control means 22 and passes directly through condenser 25. The air is then forced over the source of heat after which it leaves casing 18 through air flow control means 20.

In the event that the levers 150 and 190 continue to move after the shutter assemblies are in their fully opened positions, the spring 166 surrounding rod 160 and the spring 206 surrounding rod 200 act as over-travel limiting mechanisms to prevent injury to the several elements making up each of the shutter assemblies. The heavy springs 186 and 212 which are already under tension will be placed under a greater tension by the movement of the vanes to an open position and these springs, therefore, are operative to maintain levers 190 and 150 under tension so that if the material 132 within chamber 130 contracts due to the loss of heat in space 24, these springs will tend to move the vanes to a closed position and the levers 150, 190 back to the position shown in the drawings. On the return movement of the vanes to a closed position there is likelihood, because of constructional irregularities or for other reasons, that the vanes may not all move to a closed position at substantially the same instance, and, therefore, a lost motion connection is provided in the form of the slotted apertures 92 shown in the driven member 90, but not shown in driven member 112 although present therein, to permit the driven members to move for a short distance after any of the vanes are closed, so as to provide for a full closing movement of all of the vanes. The springs 94 tend to bias each of the vanes to a closed position and also to maintain the rivets at one end of the openings 92 so as to provide for a small amount of lost motion between each of the rivets 88 and the rod 90.

The foregoing describes the manner in which the ventilating means are used when the air conditioning apparatus 10 is being utilized for heating the interior of the truck. The air conditioning unit 10 is adapted for use in cooling the interior of enclosure 10 when the outside temperatures are relatively warm. Under these conditions it is desirable to supply the maximum amount of cold air to the space 24 since the condenser is now acting as a cooling unit rather than a heating unit as previously described. Therefore, during the warm season of the year it is preferable to open the air flow control means 20 and 22 and to maintain them open at all times. To accomplish this, the manual control means consisting of the wheel 218 is manually rotated to the left as shown in Fig. 3 which causes the bifurcated portion 148 to move downwardly on the threaded stem 220 and against the resilience of spring 222 so that the bifurcated portions 152 and 154 of lever 150 are moved downwardly and rotated on the moving pivot pin 196 in the same manner as previously described. If the action is continued until the bolt 178 engages lever 190, lever 190 is caused to rotate on pin 192 and pin 196 in unison with lever 150 until both the forward air flow control means 22 and the upper air flow control means 20 are manually moved to an open position.

It should be understood that whether the levers 150 and 190 are thermostatically controlled or manually controlled, their action is such that lever 150 is caused to move the air flow control means 20 in an opening direction prior to the time that lever 190 moves the air flow control means 22 in the direction of its opened position. By adjusting bolt 178 the two levers can be made to move at substantially the same time or at relatively large periods of time with respect to the movement of each other.

When the air conditioning apparatus is to be used to cool the interior of enclosures 11, a liquid refrigerant passes from receiver 42 through conduit 44 to the evaporator 50 and returns to the compressor 26 through conduit 51. As valve 70 is closed during the cooling operation, the heated gases pass from the high pressure side of compressor 26 through T connection 60 and conduit 62 to the condenser 25 whereafter the fluid is cooled in conduit 64 and returned to receiver 42 through conduit 43 and connection 44.

In the prior discussion of the use of the apparatus 10 as a heating unit, the source of heat has been described as an internal combustion engine 28 as well as compressor 26 since both of these elements will radiate a considerable amount of heat as well as forming currents of heated air which with the aid of fans 32 and 38 are circulated through the shroud 30 and aided by baffle 224 the heated air is directed against the condenser. It will be understood, however, that any other source of heat, such as that generated by the operation of an electric motor, if the same is substituted in place of internal combustion engine 28 would serve to a certain degree the same purposes of furnishing the source of radiant heat and heated air to the condenser.

The advantages of my invention are that I am able to provide an air conditioning unit which may be used to either heat or cool a compartment and that when used as a heating unit, the heat generated by the operative mechanism including the radiant heat generated by the motive power device and the compressor as well as convection currents or a column of forced air may be successfully transmitted to the condenser to aid in the heating operation. By controlling the ventilation within the casing that surrounds the operative mechanism, the amount of heat thus created can be carefully controlled so as to prevent injury resulting from overheating any of the parts. Furthermore, by providing a sequential control of the ventilating means, the space surrounding the several elements may be maintained at an optimum temperature and not unduly cooled if the vehicle on which the apparatus is mounted is in rapid motion. By providing thermostatic control of the ventilating means, their operation is rendered automatic depending on the temperature surrounding the several elements. However, since there are periods of time when automatic control is not required, manually operable means may be used to replace the automatic means and positive ventilation assured thereby.

As numerous changes may be apparent to those skilled in the art, my invention is defined in the terms of the appended claims.

I claim:

1. An air conditioning apparatus comprising, a refrigerant evaporator, a condenser connected in a fluid circuit with said evaporator, means for changing the fluid circuit in such a manner that the evaporator is in open communication with the condenser whereby the evaporator becomes a heating heat exchanger and receives heat from the condenser, a source of heat positioned adjacent the condenser, an enclosure having walls enveloping the condenser and the source of heat in such a manner that heat is transferred to the condenser, a movable ventilator in a wall of said enclosure, and a temperature responsive means positioned within said enclosure and operatively connected to said ventilator for moving the ventilator when the temperature within said enclosure varies beyond a predetermined range of temperature.

2. An air conditioning apparatus comprising, a refrigerant evaporator, a condenser, a fluid circuit connecting the evaporator and the condenser, means for changing the fluid circuit in such a manner that the evaporator receives heat from said condenser and becomes a heating heat exchanger, a source of heat positioned adjacent said condenser, an enclosure having walls enveloping the condenser and the source of heat, means within said enclosure for circulating the air therein in heat exchange relationship between the source of heat and the condenser, one wall of said enclosure having a controllable opening adapted to provide an exchange of air between the inside and the outside of said enclosure, and means within said enclosure for controlling said controllable opening.

3. An air conditioning apparatus comprising, a refrigerant evaporator, a condenser connected in a fluid circuit with said evaporator, a compressor connected to said evaporator, an engine for driving said compressor, means for changing the fluid circuit to said evaporator in such a manner that the evaporator becomes a heating heat exchanger, an enclosure surrounding engine and said condenser in such a manner that the heat of the engine is transmitted to said condenser, a ventilating shutter in said casing for controlling the temperature adjacent said condenser, and a temperature responsive means positioned in said enclosure and having an operative connection with said shutter for controlling the operation of said shutter.

4. In an air conditioning apparatus including a condenser, a compressor connected to said condenser, and an engine for driving said compressor, a casing surrounding said condenser, compressor, and engine, a first ventilating shutter in said casing providing exit of air within said casing, a second ventilating shutter in said casing providing admission of outside air into said casing, a temperature responsive control device within said casing being responsive to the temperature therein, and connecting members extending between said control device and each of said shutters and being operative to sequentially control the movement of said shutters in such a manner that one of said shutters normally moves through a substantial range of movement prior to the commencement of movement of the other shutter.

5. In an air conditioning apparatus including a condenser, a compressor connected to said condenser, and an engine for driving said compressor, a casing surrounding said condenser, compressor and engine, a first ventilating shutter in said casing providing exit of air within said casing, a second ventilating shutter in said casing providing admission of air into said casing, a temperature responsive control device within said casing being responsive to the temperature therein, and an operative connection between said control device and said shutters for opening the shutters to permit circulation of air within said casing when the temperature therein exceeds a predetermined limit.

6. An air conditioning apparatus, comprising a condenser, a source of heat positioned at one side of the condenser, a casing having walls surrounding the condenser and the source of heat, a ventilating shutter positioned in the top wall of said casing and above the source of heat, said shutter providing an exchange of air through the top of said casing, and a baffle positioned above the source of heat in said casing adjacent the top wall thereof, said baffle being constructed to deflect a portion of air rising from the source of heat, and directing the same in the direction of the condenser.

7. In an air conditioning apparatus including a casing, a frame member supported within said casing, a plurality of movable vanes supported by said frame member, a bracket extending from each of said vanes, a pivotal connector extending from the outer end of each of said brackets, a movable member having a plurality of apertures each of which loosely surrounds one of said pivotal connectors to provide a lost motion connection between each of said brackets and said movable member, and biasing means extending between said movable member and each of said brackets for biasing said vanes to a closed position.

8. An air conditioning apparatus comprising a condenser, a source of heat positioned adjacent said condenser, an enclosure having walls enveloping said condenser and said source of heat in such a manner that heat is transferred to said condenser, a pair of movable air flow control means mounted in separated walls of said enclosure providing air flow through said enclosure, a connecting member joined to each of said air flow control means for moving the same between open and closed positions, and manually operable means for moving said connecting members in such a manner that the one of said members is moved for a substantial distance prior to the movement of the other member.

9. In combination with an air conditioning apparatus including a condenser, a source of heat positioned adjacent the condenser, an enclosure having walls enveloping the condenser and the source of heat in such a manner that the condenser is subjected to heat emanating from said source of heat, a pair of movable air flow control means mounted in separated walls of said enclosure for ventilating the interior thereof, and means for controlling the movement of said air flow control means comprising a driving member, a first lever connected to one of said air flow control means, said first lever having a portion normally in contact with the driving member for movement therewith, a second lever connected to the other of said air flow control means, said second lever having a portion extending in the path of movement of said first lever, the contacting surfaces of said first and second levers being spaced from each other in such a manner that the first lever moves through a portion of its path of movement before it contacts said second lever.

10. An air conditioning apparatus including in combination, a casing, first and second ventilating dampers supported by said casing, a control device for operating said dampers comprising a chamber positioned within said casing containing a thermally expansible material which is responsive to the temperature within said casing, a piston extending through a portion of said chamber and adapted for movement by the expansion of said expansible material, a first lever connected at one end to the first of said dampers and having a portion extending in the path of movement of said piston for movement thereby, and a second lever connected at one end to the second of said dampers and having a portion extending in the path of movement of said first lever for movement therewith, the contacting surfaces of said first and second levers being spaced with relation to each other in such a manner that the first lever is capable of movement through a substantial portion of its path of movement prior to contacting the second lever.

11. An air conditioning apparatus including in combination, a casing, first and second ventilating dampers supported by said casing, a control device for operating said dampers, comprising a chamber positioned within said casing containing a thermally expansible material which is responsive to the temperature within said casing, a piston extending through a portion of said chamber and adapted for movement by the expansion of said expandable material, a first lever connected at one end to the first of said dampers and having a portion extending in the path of movement of said piston for movement thereby, a second lever connected at one end to the second of said dampers and having a portion extending in the path of movement of said first lever for movement therewith, the contacting surfaces of said first and second levers being spaced with relation to each other in such a manner that the first lever is capable of movement through a substantial portion of its path of movement prior to contacting the second lever, and manually operable means connected to said first lever for manually superceding the movement of said piston.

12. An air conditioning apparatus, comprising a refrigerant evaporator, a condenser connected in a restricted fluid circuit with said evaporator, means for changing the fluid circuit in such a manner that the evaporator is in open communication with the condenser whereby the evaporator becomes a heating heat exchanger and receives heat from the condenser, a source of heat positioned adjacent the condenser, an enclosure having walls enveloping the condenser and the source of heat, a movable ventilator in a wall of said enclosure, temperature responsive means positioned within said enclosure and operatively connected to said ventilator for moving the same when the temperature within said enclosure varies beyond a predetermined range of temperature, and manually operable means associated with said temperature responsive means for manually moving said ventilator, said manually operable means being operative to supercede said temperature responsive means.

13. In an air conditioning apparatus including a condenser, a source of heat positioned adjacent said condenser, a casing having walls enveloping said condenser and said source of heat, a movable ventilating vane supported in a wall of said casing, a control device positioned in said casing having a movable element, a lever extending between the movable element of said control device and said vane for moving the vane to an open position, and a lost motion connection joined to said lever to provide for overtravel of the lever when the vane is in a fully opened position.

14. An air conditioning apparatus comprising, a heat exchanger, a source of heat, a casing having walls enclosing said heat exchanger and said source of heat, means within said casing for directing air in heat exchange relationship between the source of heat and the heat exchanger in such a manner that the air passes consecutively from the source of heat to the heat exchanger to heat the heat exchanger, and ventilating means carried by said casing being operative to reverse the direction of flow of air between the heat exchanger and the source of heat in such a manner that the air passes consecutively from the heat exchanger to the source of heat to thereby cool the heat exchanger.

15. An air conditioning apparatus, comprising a refrigerant evaporator, a condenser connected in a restricted fluid circuit with said evaporator, means for changing the fluid circuit in such a manner that the evaporator is in open communication with the condenser whereby the evaporator becomes a heating heat exchanger and receives heat from the condenser, a source of heat positioned adjacent the condenser, an enclosure having walls enveloping the condenser and the source of heat, means within said enclosure for directing air in consecutive contact with the source of heat and the heat exchanger whereby the heat exchanger is heated, movable ventilating means carried by said enclosure being operative on movement in one direction to reverse the direction of flow of air whereby the air is directed in consecutive contact with the heat exchanger and the source of heat to cool the heat exchanger, and temperature responsive control means positioned in the path of air movement to move the ventilating means to said one position.

FREDERICK M. JONES.

REFERENCES CITED

The following references are of record in the file of this patent:

UNITED STATES PATENTS

| Number | Name | Date |
|---|---|---|
| 1,453,379 | Coy | May 1, 1923 |
| 1,681,157 | Eggleston | Aug. 14, 1928 |
| 1,699,020 | Raleigh | Jan. 15, 1929 |
| 2,135,810 | Germonprez | Nov. 8, 1938 |
| 2,214,933 | Nelson | Sept. 17, 1940 |
| 2,263,476 | Sunday | Nov. 18, 1941 |
| 2,302,197 | Edwards | Nov. 17, 1942 |
| 2,318,858 | Hornaday | May 11, 1943 |
| 2,455,421 | Kirkpatrick | Dec. 7, 1948 |